Dec. 11, 1928.                                                           1,694,706
A. HERZ
SCREEN
Original Filed Jan. 22, 1917
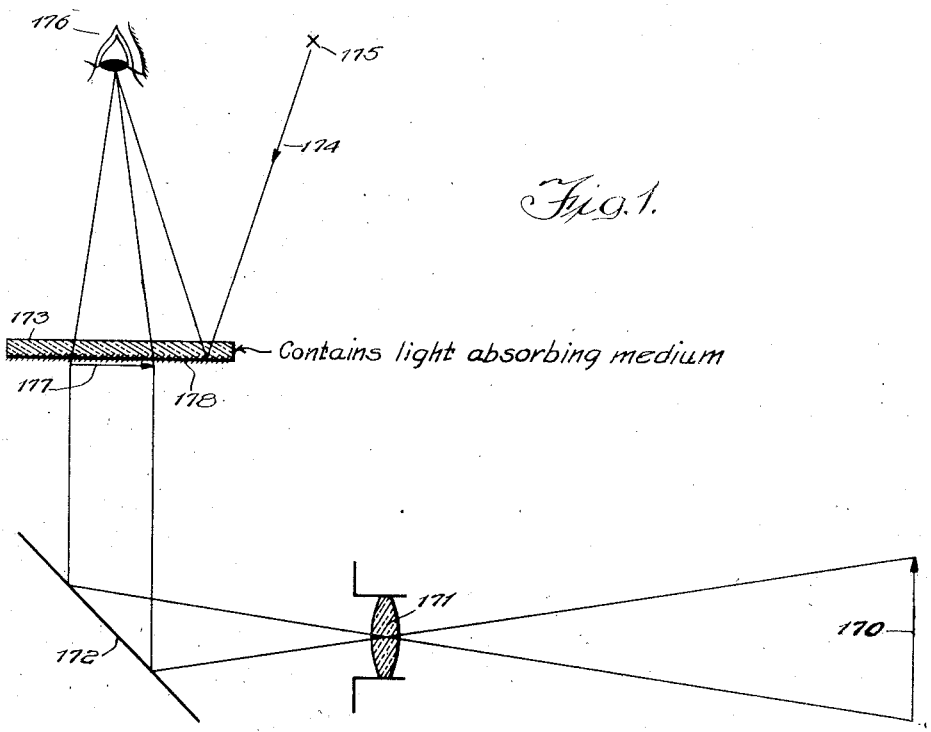
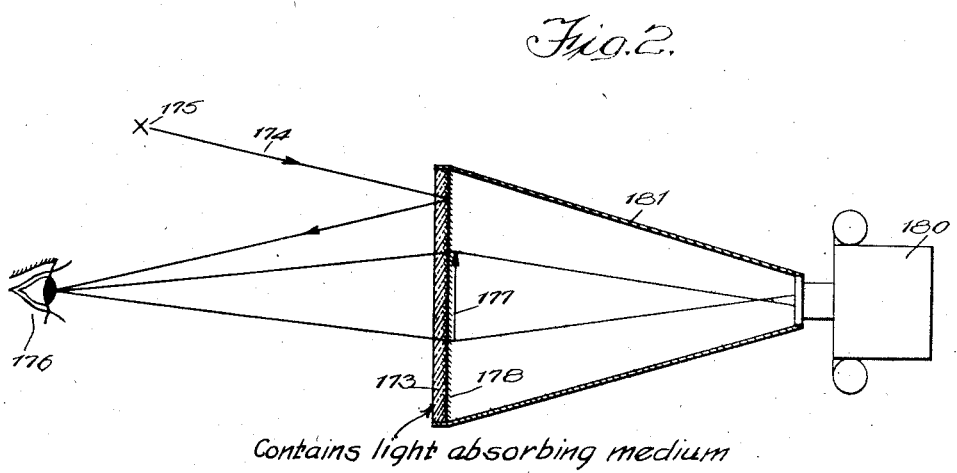

Patented Dec. 11, 1928.

1,694,706

UNITED STATES PATENT OFFICE.

ALFRED HERZ, OF CHICAGO, ILLINOIS.

SCREEN.

Original application filed January 22, 1917, Serial No. 143,613. Divided and this application filed December 16, 1926. Serial No. 155,135.

My invention relates to a screen for making visible light images projected thereon.

Screens for this purpose are known but do not provide the novel means for excluding the disturbing effect of extraneous light which is the essence of the present invention.

The prevent application is divisional in part of my copending application, Serial No. 143,613, filed January 22, 1917, now Patent No. 1,614,672, January 18, 1927.

The invention may be applied to different specific uses such, for example, as forming the ground or field plate of a camera finder or a picture projecting screen and the like.

The principle upon which my invention proceeds is the following. A plate or sheet is provided with light diffusing means such as a ground or matted surface on the surface of a transparent or semi-transparent medium. The sheet may be a thin light diffusing body or contain light diffusing material on its surface or within its body. This light diffusing means makes the light image visible in a definite position or plane and it may be termed an image holding means.

Between the eye of the observer and the said light diffusing or image holding means a layer or body of light absorbing means is interposed. This layer or body may be a part of the means for supporting the light diffusing or image holding means such as the glass or other transparent plate or sheet, i. e., a layer on or in the same or may be formed by introducing into the glass or other transparent plate a stain, dye or other light absorbing medium which tends to hinder or oppose the passage of light.

Instead of the absorbing means such as stained glass or the like supporting the light diffusing means, namely, the frosted surface, the light diffusing means may be a sheet or plate self-supporting such, for instance, as thin semi-transparent fibrous material such as oiled or waxed paper sized cloth or the like and the light absorbing means may constitute a layer or prepared surface supported thereby.

The image projecting means which may be the finder lens of the view finder or may be the picture projecting means is placed back of the image holding sheet, plate or surface with the light absorbing sheet, plate or surface between the eye of the observer and the image holding means. The light from the image which is held or formed on the image holding means passes through the light absorbing medium 1 and then strikes the eye of the observer. Extraneous light which may come from the observer's side of the screen will pass through the light absorbing medium before it strikes the image holding surface and again pass through the light absorbing medium before striking the eye of the observer.

The light absorbing medium need not be absolutely uniform throughout, it may be broken up into lines, points or the like, but for best effect it should give to the eye of the observer a generally uniform field or effect.

In order to acquaint those skilled in the art with the manner of constructing and operating a device embodying my invention I shall describe in connection with the accompanying drawings a specific embodiment of the same.

Figure 1 is a diagram of a screen of my invention embodied in a view finder such as is employed in cameras or the like;

Fig. 2 is a similar diagram indicating the manner of using the screen of my invention in connection with the projection of pictures.

In Fig. 1 the parts of the finder are indicated only as to essentials.

The object 170 in front of the lens 171 throws off rays of light which are directed by the lens 171 upon a suitable mirror 172 inclined at a suitable angle to throw the rays of light upon the field plate or image receiving plate 173 which heretofore has consisted of ground clear glass. That is to say, this plate has heretofore been entirely constructed of a transparent plate of glass having one side or surface frosted or matted for the purpose of receiving the image formed by the lens 171. I have found that in employing such a field plate it is subject to interference from external light to such an extent that a shield is almost indispensible. Assume that a ray of light 174 coming from a source 175 falls upon the plate 173, it is broken up at the frosted or matted surface of the field plate and the light therefrom is directed into the eye of the observer at 176, this amount of light being particularly, when the sky overhead is bright or there are other conflicting lights, of such quantity as to interfere very seriously with the image 177 which appears upon the field plate. In order to correct for external and extraneous light, I have changed the character of the field plate 173 in the following particular, namely, I have provided the same with a material which shuts off to a certain extent the passage of light therethrough. The ray of light 174 before it can reach the eye 176 is then compelled to pass twice through the light obstructing medium which is embodied in the plate 173, and is thus subjected twice through an obstruction while the light coming from the subject 170 is subjected to this obstruction but once. Experiments with this type of field plate of image receiving plate shows that the same is very little affected regardless of the type of overhead light.

I have employed for this purpose thin plates of gelatin, celluloid, glass, and the like, stained with a suitable dye or color, the lower surface being ground, frosted or matted as indicated at 178, to form the actual image receiving surface, and the plate or film above forming a supporting means for the surface, and forming the obstructing means for obstructing external light such as that illustrated by the ray 174 in Figure 1. The dye or color which forms the light obstructing means may be evenly distributed throughout the body of the plate or may be contained in a layer. The image forming surface may be formed otherwise than by matting, grinding or frosting the surface, as for instance, by adding a thin layer of material suitable for making the image apparent. I consider this form of field plate or image receiving plate to be broadly new.

Where the means which forms the image holding medium is a self-supporting sheet, plate or the like, the dye or other light absorbing means may be placed in a layer either uniformly or in lines, dots or other regular patterns to give a regular effect upon the surface adjacent the eye of the observer. The color which I have successfully used in the practice of this invention is a cobalt blue for the glass plate 173 either in the glass or placed upon the surface of the same.

In Fig. 2 I have shown the screen 173 as applied to the viewing of pictures projected by the picture projecting device 180. A light excluding box 181 may be placed between the field or screen 173 and the lens of the picture projecting machine to exclude extraneous light from that side of the screen, certainly this would be unnecessary on a darkened stage.

The operation of this form of the device is the same as above described.

I do not intend to be limited to the precise details of construction shown and described.

I claim:

1. In a screen of the class described, a plate of transparent material having embodied therein a light obstructing substance, one surface of said plate being ground or matted.

2. A screen of the class described comprising a sheet of material having one surface thereof ground or matted to receive and make apparent an image, said screen comprising a light hindering substance, said sheet being of sufficient transparency to permit the light from the image to be viewed through the sheet.

3. In a device of the class described, a unitary integral sheet embodying a light diffusing medium lying in substantially a single plane to hold an image in said plane and a light obstructing medium paralleling said image holding medium and lying between the latter and the eye of the observer.

4. In a screen of the class described, a transparent glass sheet having a light obstructing material embodied therein and having one surface thereof which is adapted to face the projection device, roughened to provide a fine granular screen for receiving and making apparent an image.

In witness whereof, I hereunto subscribe my name this 14th day of December, 1926.

ALFRED HERZ.